(12) United States Patent
Rostampour et al.

(10) Patent No.: US 7,260,666 B2
(45) Date of Patent: Aug. 21, 2007

(54) SUPPORTING MULTIPLE METHODS FOR DEVICE HOTPLUG IN A SINGLE COMPUTER

(75) Inventors: Arad Rostampour, Fort Collins, CO (US); Paul Bouchier, Little Elm, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 93 days.

(21) Appl. No.: 11/189,572

(22) Filed: Jul. 26, 2005

(65) Prior Publication Data

US 2007/0028023 A1 Feb. 1, 2007

(51) Int. Cl.
*G06F 13/10* (2006.01)
(52) U.S. Cl. .................................................... 710/304
(58) Field of Classification Search ........ 710/301–304, 710/260, 268
See application file for complete search history.

(56) References Cited

U.S. PATENT DOCUMENTS

| | | | |
|---|---|---|---|
| 5,781,798 A | 7/1998 | Beatty et al. | |
| 6,105,089 A | 8/2000 | Chari et al. | |
| 6,162,073 A | 12/2000 | Haq et al. | |
| 6,173,346 B1 | 1/2001 | Wallach et al. | |
| 6,192,434 B1 | 2/2001 | Wallach et al. | |
| 6,247,079 B1 | 6/2001 | Papa et al. | |
| 6,304,929 B1 | 10/2001 | Wallach et al. | |
| 6,484,226 B1 | 11/2002 | Wallach et al. | |
| 6,529,987 B1 | 3/2003 | Reid | |
| 6,792,494 B2 | 9/2004 | Bennett et al. | |
| 6,907,474 B2 * | 6/2005 | Oshins et al. ................ | 719/321 |
| 7,000,153 B2 * | 2/2006 | Inagawa et al. .............. | 714/44 |
| 7,065,597 B2 * | 6/2006 | Kumar et al. ................ | 710/260 |
| 7,188,205 B2 * | 3/2007 | Le et al. ...................... | 710/300 |
| 2002/0144043 A1 | 10/2002 | Bennett et al. | |
| 2003/0093255 A1 | 5/2003 | Freyensee et al. | |
| 2003/0167367 A1 | 9/2003 | Kaushik et al. | |
| 2003/0208676 A1 * | 11/2003 | Bard et al. ..................... | 713/2 |
| 2004/0003159 A1 | 1/2004 | Kumar et al. | |
| 2004/0064620 A1 | 4/2004 | Kaushik et al. | |
| 2004/0103345 A1 * | 5/2004 | Dunstan ....................... | 714/24 |
| 2004/0215865 A1 | 10/2004 | Arimilli et al. | |
| 2004/0230731 A1 | 11/2004 | Arimilli et al. | |
| 2004/0268002 A1 | 12/2004 | Arramreddy | |
| 2005/0195081 A1 * | 9/2005 | Studnicki et al. ....... | 340/539.26 |
| 2007/0005866 A1 * | 1/2007 | Pike et al. .................. | 710/306 |

FOREIGN PATENT DOCUMENTS

WO WO 2004/031950 A2 4/2004

OTHER PUBLICATIONS

HP Service Guide, HP 9000 rp7420, Third Edition, Mar. 2005, 255 pgs., http://docs.hp.com/en/A7025-96011/.

* cited by examiner

*Primary Examiner*—Glenn A. Auve
*Assistant Examiner*—Trisha Vu

(57) ABSTRACT

A computer-implemented method is disclosed for use in a computer system. The method includes: (A) receiving an indication of a first hotplug event for a first operating system executing in the computer system; (B) identifying, among a plurality of hotplug handling methods, a first hotplug handling method associated with the first operating system; and (C) handling the first hotplug event using the first hotplug handling method.

20 Claims, 7 Drawing Sheets

SUPPORTING MULTIPLE METHODS FOR DEVICE HOTPLUG IN A SINGLE COMPUTER

CROSS REFERENCE TO RELATED APPLICATIONS

This application is related to a concurrently-filed and commonly-owned U.S. patent application entitled, "Event Generation for Device Hotplug," which is hereby incorporated by reference.

BACKGROUND

Computers often contain internal devices, such as network cards and video cards, that may be detached from the I/O bus to which they are connected. For example, if a device malfunctions, it may be necessary to detach the device from the bus and to attach a new device to the bus. Similarly, it may be desirable to detach a device from the bus to replace the device with a different, superior, device.

Detaching a device from the I/O bus of an older computer system while the computer system was running would cause serious damage to the computer system. As a result, detaching a device from such a system required powering down the system, detaching the device (and replacing it with a new device, if appropriate), and powering up the system again. This was tedious and time-consuming. Furthermore, the computer system could not be used for other functions (such as running application programs that did not require the detached device) while it was powered down. This would decrease the productivity of the computer's users. If the computer was a server or other computer that was required for use by multiple users simultaneously, detaching a single device from the computer could disrupt the work being performed by all of those users.

As a result, techniques were developed which made it possible to detach and attach devices to a computer system while the system was running. This ability is referred to as "hotplugging" or "hotswapping" to indicate that the computer is "hot" (powered on) while devices are added to and removed from it.

ACPI (Advanced Configuration and Power Interface) is an open industry specification that is one example of a technology for facilitating hotplugging. ACPI defines a variety of firmware, hardware, and operating system interfaces for accomplishing system configuration, power management, plug 'n play, and a variety of other system-specific behaviors. For example, ACPI defines interfaces for performing hotplug of devices connected to PCI buses.

ACPI uses "general purpose events" (GPEs) for a variety of purposes, including signaling that the user desires to perform a hotplug. GPE events are typically implemented as follows. To signal the occurrence of an incident (such as the pressing of a doorbell) that should trigger a GPE event, a hardware device stores a predetermined value in a pre-designated hardware register in a block of registers referred to as a "GPE block." This causes a GPE event to be generated and transmitted to the operating system. Each GPE is associated with a firmware method. In response to receiving a GPE event, the operating system executes the associated firmware method. For example, if the event is a doorbell event, then the associated method prepares the device from the corresponding slot to be added/removed.

Older versions of ACPI (such as version 1.0b) only supported a single GPE block, divided into two sub-blocks. Although a single GPE block may have been sufficient for small, single-partition computer systems, it often is not sufficient for multi-partition systems.

For example, a single GPE block, consisting of two sub-blocks, can support a maximum of two sets of 128 GPE events each. Such a GPE block can therefore support at most two cells, each with 128 GPEs. In a multi-partition computer, a partition may contain more than two cells in which GPEs occur, and the total number of events may exceed 256. In such a system, a single GPE block per partition is insufficient to support hotplug in all cells. In some systems, a single GPE block is provided in every cell to simplify wiring and configuration of partitions, but in such systems an operating system that supports older versions of ACPI can still only support hotplug events in a single one of the cells.

ACPI version 2.0 began to support multiple GPE blocks, thereby solving the problem just described. Some operating systems, such as variants of Unix (including the Linux and HP-UX® operating systems), support these newer versions of ACPI. Some operating systems, however, such as some versions of Microsoft Windows operating systems, do not support this and newer versions of ACPI, and therefore cannot take advantage of multiple GPE blocks.

A single computer may include a plurality of "cells," each of which has its own processor, set of PCI slots, and other hardware. Such a computer may be logically subdivided into a plurality of partitions, each of which may include one or more cells. Consider, for example, a 16-cell computer that may be divided into 1, 2, 4, 8, or 16 partitions having 16, 8, 4, 2, or 1 cell each, respectively. Each partition in such a multi-partition computer may execute a different operating system, some of which support the newer versions of ACPI and some of which do not. Therefore, it is possible for a single complex to include a plurality of operating systems, some of which provide support for multiple GPE blocks and some of which do not.

Operating systems, such as Microsoft Windows operating systems, which support only a single GPE block, do not support "distributed GPEs," which allow a GPE block in each cell. As a result, such operating systems do not support GPE events in more than two cells of a partition. (ACPI allows a single GPE block to be subdivided into two sub-blocks at two addresses, thereby effectively allowing two cells to have GPE blocks.)

Using conventional architectures, such operating systems do not support hotplug in more than two cells in a partition, because the required GPE events cannot be supported in all cells. It is desirable to support hotplug in all cells in a partition, regardless of the number of cells in the partition and the capabilities of the operating system executing in the partition. Furthermore, it is desirable to support hotplug in all cells of all partitions in a computer system, regardless of the number of partitions and the mixture of operating systems executing in those partitions.

SUMMARY

A computer-implemented method is disclosed for use in a computer system. The method includes: (A) receiving an indication of a first hotplug event for a first operating system executing in the computer system; (B) identifying, among a plurality of hotplug handling methods, a first hotplug handling method associated with the first operating system; and (C) handling the first hotplug event using the first hotplug handling method.

DETAILED DESCRIPTION

Figure 1A:
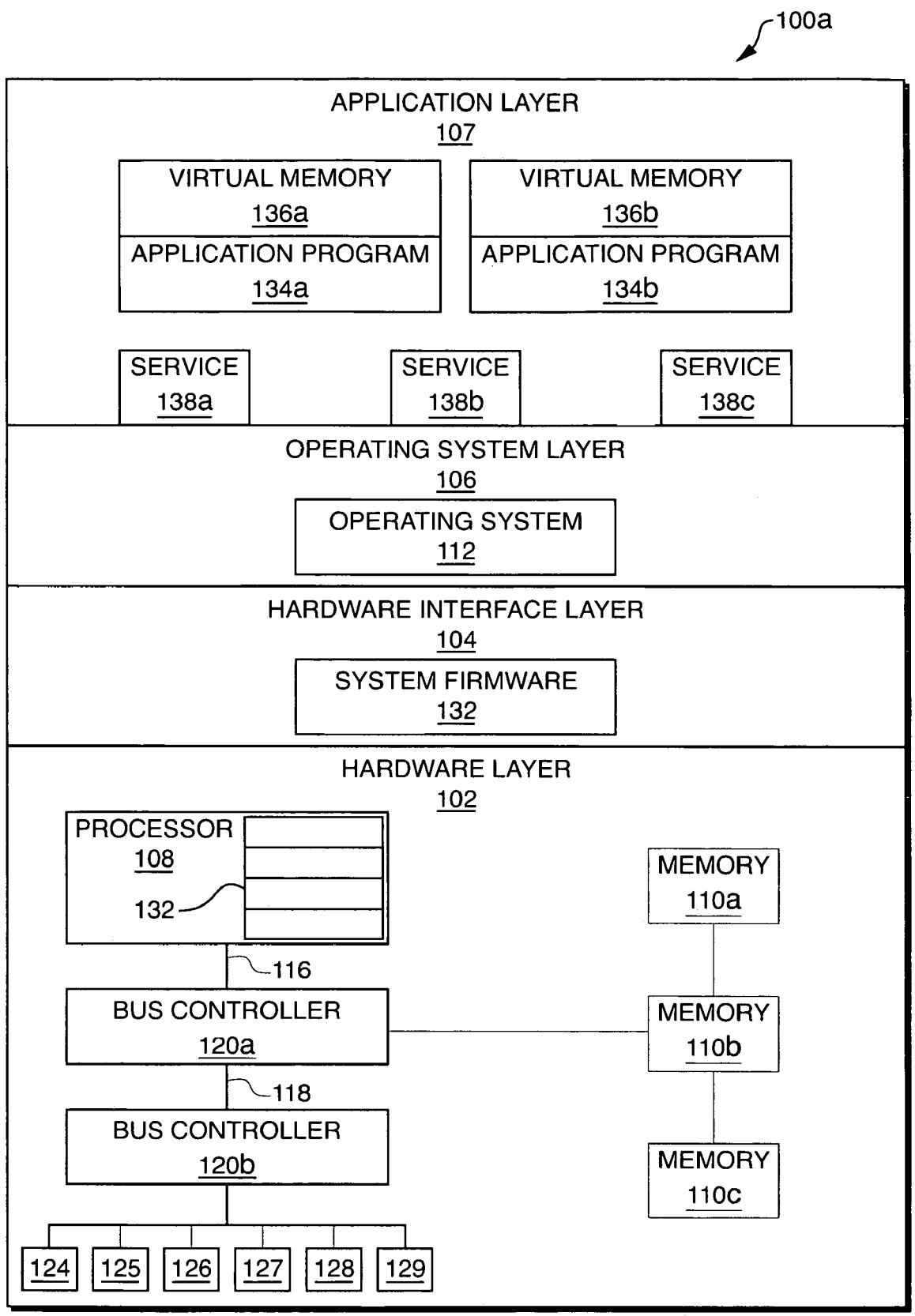
FIG. 1A is a block diagram of the architectural layers of one embodiment of a computer system.

Referring to FIG. 1A, a block diagram is shown of one embodiment of a computer system 100a. The computer system 100a includes a hardware layer 102, a hardware interface layer 104, an operating system layer 106, and an application program layer 107. The operating system and application programs in the computer system 100a execute on hardware in the hardware layer 102. The "layers" 104, 106, and 107 illustrated in FIG. 1A do not, therefore, represent physical layers of components which are physically layered on top of the hardware layer 102. Rather, the computer system 100a is illustrated as consisting of layers 102, 104, 106, and 107 as an aid to explaining the interactions among hardware and software in the computer system 100a. In particular, it is common to conceptualize and illustrate computer systems in terms of such layers to highlight the dependence of elements at a higher layer on elements at lower layers, and to illustrate the flow of control and data among layers.

The hardware layer 102 comprises the physical components of the computer system 100a. Such physical components may include, for example, a processor 108, memory storage components 110a-c, internal buses and signal lines 116-119, bus controllers 120a-b, and various peripheral interface cards 124-129. The processor 108 is an instruction-execution device that executes a stream of instructions obtained from memory components 110a-c. The processor 108 contains internal memory storage components referred to as registers 130 that can be accessed much more quickly than the memory components 110a-c. The processor 108 reads and writes data and instructions from and to the memory components 110a-c via internal buses 116 and 117 and the bus controller 120a. Far greater data storage capacity resides in peripheral data storage devices such as disk drives, CD-ROM drives, DVD drives, and other such components that are accessed by the processor 108 via internal buses 116, 118, and 119, bus controllers 120a-b, and one or more of the peripheral device interconnect cards 124-129. For example, the stored instructions of a large program may reside on a disk drive for retrieval and storage in memory components 110a-c on an as-needed basis during execution of the program. More sophisticated computers may include multiple processors with correspondingly more complex internal bus interconnections and additional components.

The operating system layer 106 is a logical layer which includes a software program 112 referred to as an operating system, which is capable of controlling the hardware components in the hardware layer 102. Modern operating systems are relatively large and complex, typically consisting of a large number of sub-programs executing concurrently. At its core, however, the operating system 112 includes program code which may be utilized by application programs to cause the hardware components in the hardware layer 102 to perform functions such as reading from and writing to memory and peripheral devices.

The hardware interface layer 104, as its name suggests, acts as an interface between the operating system layer 106 and the hardware layer 102. The hardware interface layer 104 may include hardware, software, firmware, or any combination thereof. One purpose of the hardware interface layer 104 may be to provide a single abstract interface through which the operating system layer 106 may communicate with the processor 108 and other components in the hardware layer 102, regardless of the particular manner in which such components are implemented.

The hardware interface layer 104 includes system firmware 132. As will be described in more detail below, the system firmware 132 performs functions such as writing and reading the values of system-wide parameters.

The application programming layer 107 includes one or more application programs. Two application programs 134a-b illustrated in FIG. 1A for ease of illustration and explanation. The operating system 112 allocates virtual memory regions 136a-b to application programs 134a-b, respectively. Note that the virtual memory regions 136a-b are not additional regions of physical memory, but rather are logical regions which are mapped to memory locations in the memory components 110a-c. Requests by the application programs 134a-b to access the corresponding virtual memory regions 136a-b are passed through the operating system 112, which performs the requested read/write operation on the appropriate location(s) in the memory components 110a-c. In addition, the operating system 112 denies any request by the application programs 134a-b to access memory addresses outside of their respective virtual memory regions 136a-b.

Figure 1B:
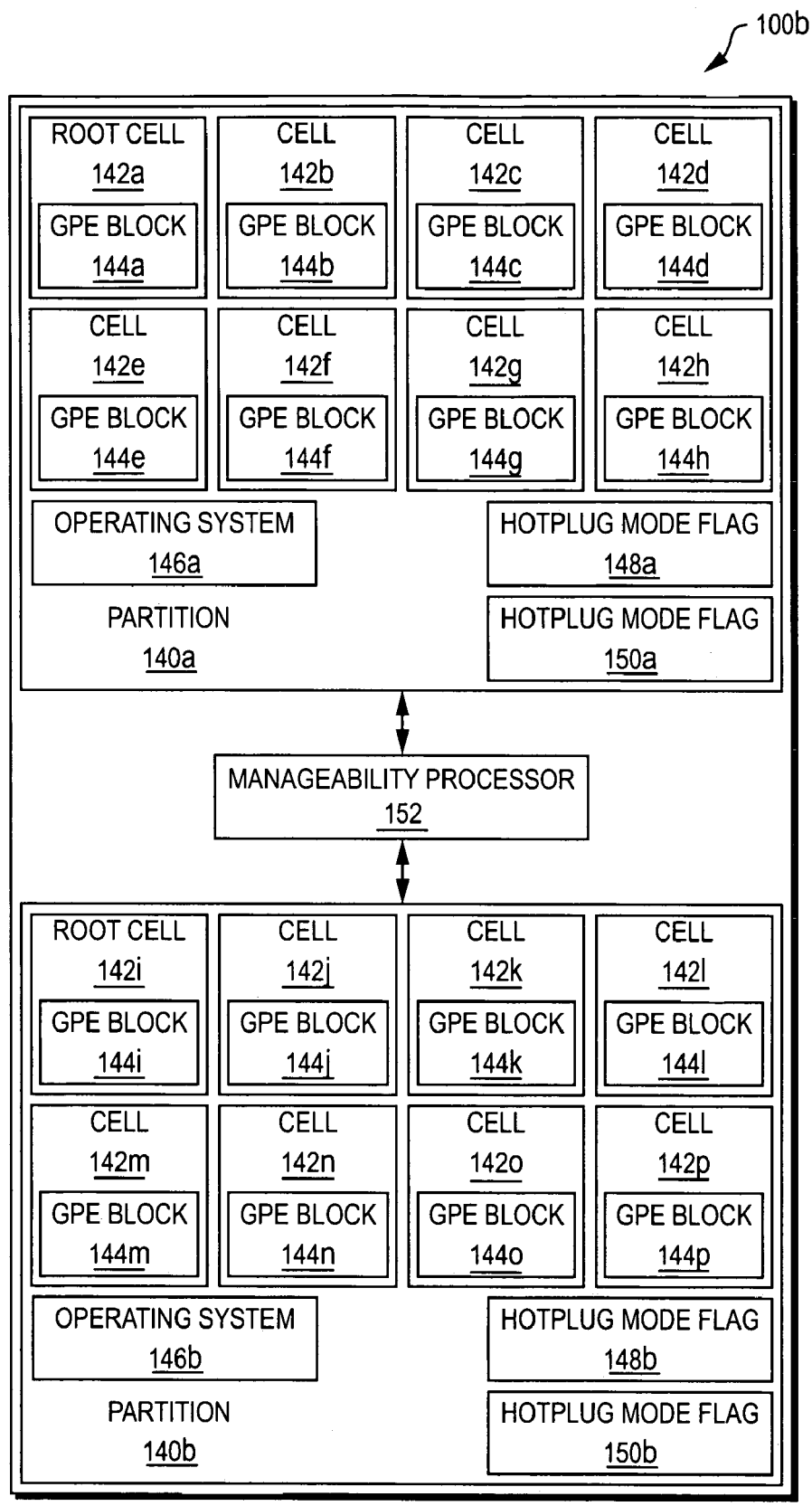
FIG. 1B is a block diagram of the cells and partitions of the computer system of FIG. 1A in one embodiment.

Referring to FIG. 1B, a block diagram is shown of a different view 100b of the computer system 100a illustrated in FIG. 1A. The views 100a and 100b shown in FIGS. 1A and 1B may be referred to herein collectively as "the computer system 100." FIG. 1B depicts the computer system 100 not in terms of a series of layers, but instead in terms of a plurality of cells 142a-p logically grouped into partitions 140a-b. More specifically, there are sixteen cells 142a-p, logically subdivided into two partitions 140a-b of eight cells each. These particular numbers and distributions of cells and partitions are provided merely for purpose of example.

Note that for ease of illustration and explanation, FIG. 1A illustrates only a subset of the computer system 100. For example, the hardware layer 102 shown in FIG. 1A includes the hardware typically provided in a single one of the cells 142a-p shown in FIG. 1B. The computer system 100b as illustrated in FIG. 1B, therefore, includes a plurality of hardware layers, one for each of the cells 142a-p. Similarly, the operating system layer 106 shown in FIG. 1A corresponds to one of the operating systems 146a-b shown in FIG. 1B. The computer system 100b as illustrated in FIG. 1B, therefore, includes a plurality of operating systems 146a-b, one for each of the partitions 140a-b.

The computer system 100*b* also includes a manageability processor 152. A manageability processor is a processor commonly used in servers to perform system management functions such as accessing the OS console or managing system events. As will be described in more detail below, the manageability processor 152 itself is not contained within any particular partition or cell and can provide services across cells and partitions. It may present devices within particular partitions or be connected to existing devices within the partition.

The 16-cell computer system 100*b* shown in FIG. 1B may, for example, be logically divided into two or more logical partitions, each of which may contain one or more cells. In the example shown in FIG. 1B, the computer system 100*b* is logically subdivided into two partitions 140*a-b*, each of which contains eight cells. Each of these partitions 140*a-b* aggregates the computing resources of its cells and provides the behavior of a distinct computer system. For example, partition 140*a* executes operating system 146*a* on the cells 142*a-h*, while partition 140*b* executes a second operating system 146*b* on the cells 142*i-p*. Techniques for implementing multi-cell, multi-partition computer systems are well-known to those having ordinary skill in the art, and will therefore not be described in detail herein.

A single cell in each partition may be designated as that partition's "root cell" (also referred to as a "core cell"). For example, cell 142*a* has been designated as the root cell of partition 140*a*, and cell 142*i* has been designated as the root cell of partition 140*b*. The root cell may be chosen arbitrarily from among a partition's cells. The root cell may perform special functions and contain partition-wide resources for the partition, such as ACPI hardware that is used in generating hotplug events, as will be described in more detail below. Alternatively, there may be no root cell, and partition-wide resources may be located anywhere in the partition.

In the example shown in FIG. 1B, the operating system 146*a* executing in partition 140*a* is an operating system that does not support ACPI version 2.0 or greater. For example, the operating system 146*a* may be a version of the Microsoft Windows family of operating systems. In the example shown in FIG. 1B, the operating system 146*b* executing in partition 140*b* is an operating system that supports ACPI version 2.0 or greater. For example, the operating system 146*b* may be a version of the Linux or HP-UX operating systems.

The cells 142*a-p* are provided with corresponding GPE blocks 144*a-p*. Recall that the operating system 146*a* supports only a single GPE block, which may be subdivided into two sub-blocks. Techniques will be described below for enabling the operating system 146*a* to handle hotplug events in any of the cells 142*a-h* using only a single one of the GPE blocks 144*a-h* (such as the GPE block 144*a* in the root cell 142*a*). Recall that the operating system 146*b* supports multiple GPE blocks. The operating system 146*b* may, therefore, handle hotplug events in the cells 142*i-p* using the corresponding GPE blocks 144*i-p*. Techniques will be described below for enabling the computer system 100 to handle hotplug events correctly in any cell in any partition, regardless of whether the operating system executing in the partition supports the use of multiple GPE blocks.

Figure 2:
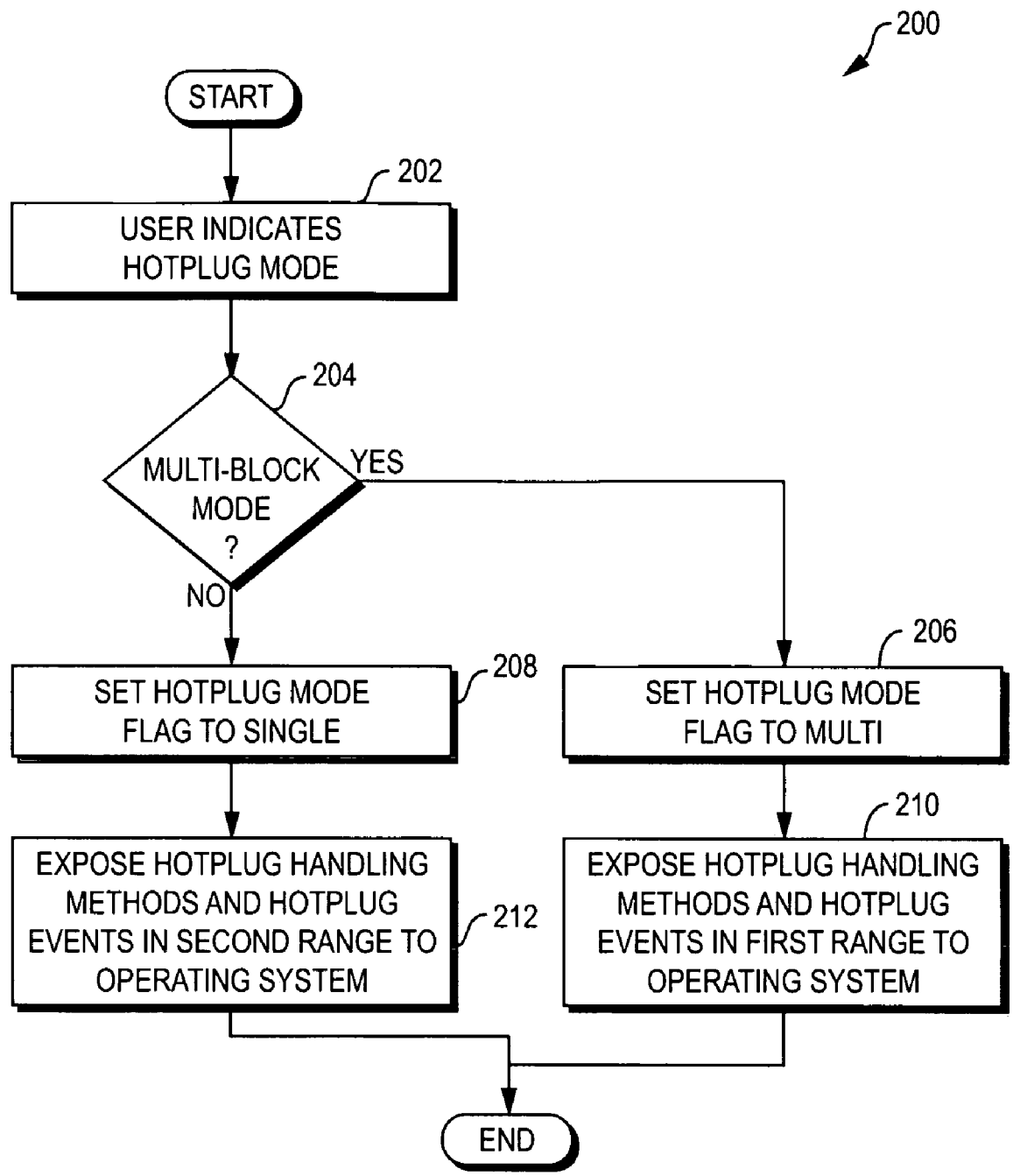
FIG. 2 is a flowchart of a method that is used to initialize the computer system shown in FIGS. 1A-1B in one embodiment.

Referring to FIG. 2, a flowchart is shown of a method 200 that may be used to initialize the computer system 100 shown in FIGS. 1A-1B. The method 200 is performed for each partition in the computer system 100. Each partition in the computer system 100*a* may operate in one of two "hotplug modes": single-block mode or multi-block mode. Operating systems (such as Microsoft Windows Server 2003) that only support ACPI versions 1.0b and lower and therefore only support a single GPE block are referred to herein as "single-block operating systems." A partition running a single-block operation system may operate in single-block hotplug mode.

Similarly, operating systems (such as Linux and HP-UX) that support ACPI versions 2.0 and higher and therefore support multiple GPE blocks are referred to herein as "multi-block operating systems." A partition running a multi-block operating system may operate in multi-block hotplug mode.

Partitions 140*a-b* includes hotplug mode flags 148*a-b* that indicate whether the partition is operating in single-block mode or multi-block mode. The flags 148*a-b* may, for example, be stored in firmware.

Returning to FIG. 2, when the computer system 100 boots up, the value of the hotplug mode flag in each partition may be set by the system firmware 132 as follows. A user indicates, during partition creation or reconfiguration, whether the current partition is to operate in single-block mode or multi-block mode (step 202). The user may provide this indication in any of a variety of ways, such as by specifying the version of ACPI (e.g., 1.0 or 2.0) that the partition's operating system supports, by specifying the operating system to boot into the partition, or by expressly specifying whether the selected operating system supports multiple GPE blocks.

The system firmware 132 determines, based on the input provided by the user in step 202, whether the current partition is to operate in multi-block mode (step 204). The system firmware 132 stores the value of the hotplug mode flag in the current partition based on the outcome of the determination made in step 204. For example, assume that the hotplug mode flag has two possible values: MULTI (for multi-block mode) and SINGLE (for single-block mode). Because the flag has only two possible values, the flag may be implemented in a single bit, such as a bit in an auxiliary register in system firmware 132. If the user specified that the partition is to operate in multi-block mode, then the value of the flag is set to MULTI (e.g., 0) (step 206). Otherwise, the value of the flag is set to SINGLE (e.g., 1) (step 208).

Figure 3:
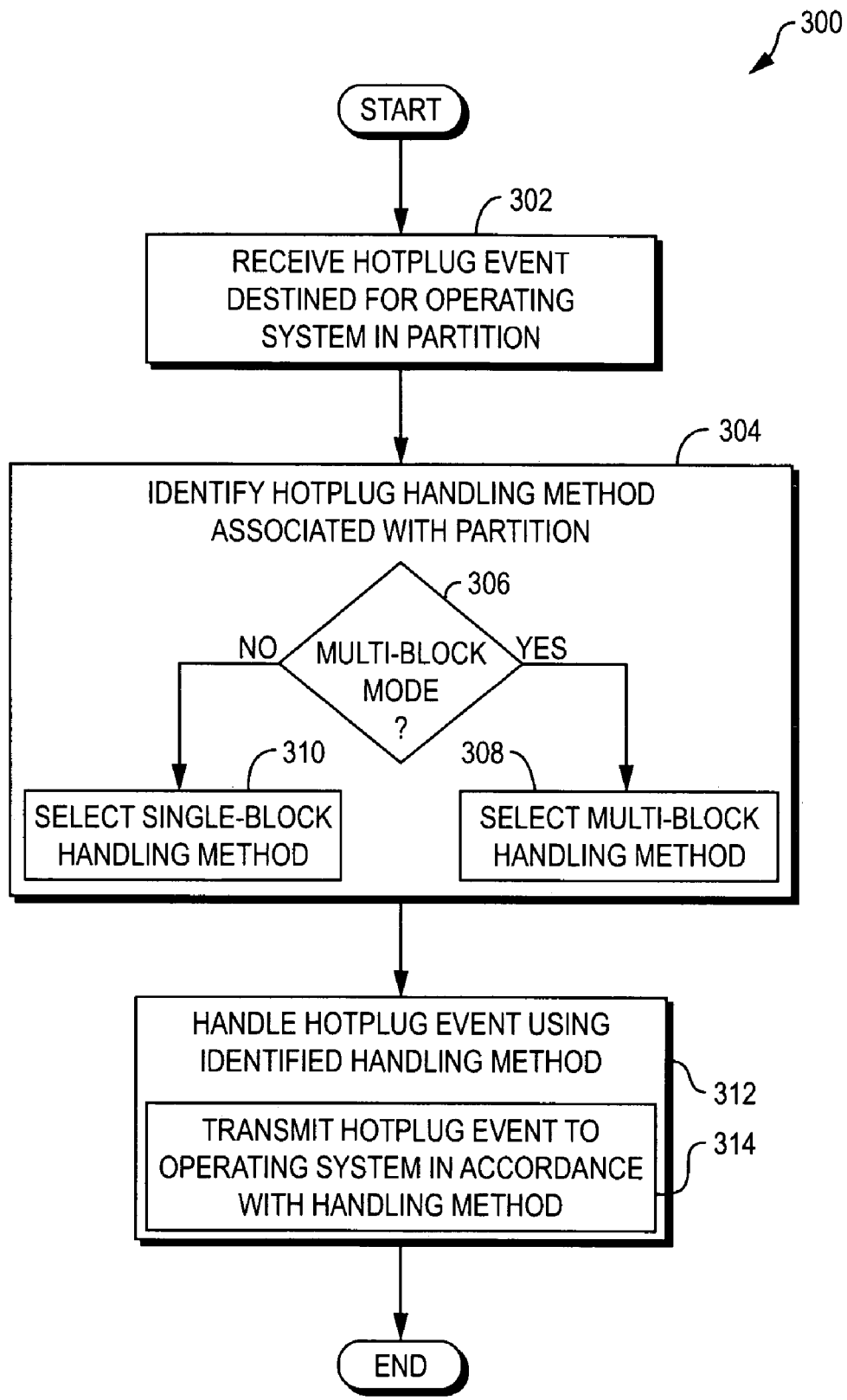
FIG. 3 is a flowchart of a method that is performed by the computer system of FIGS. 1A-1B in one embodiment to handle hotplug events for any of the operating systems executing in the computer system.
Figure 4:
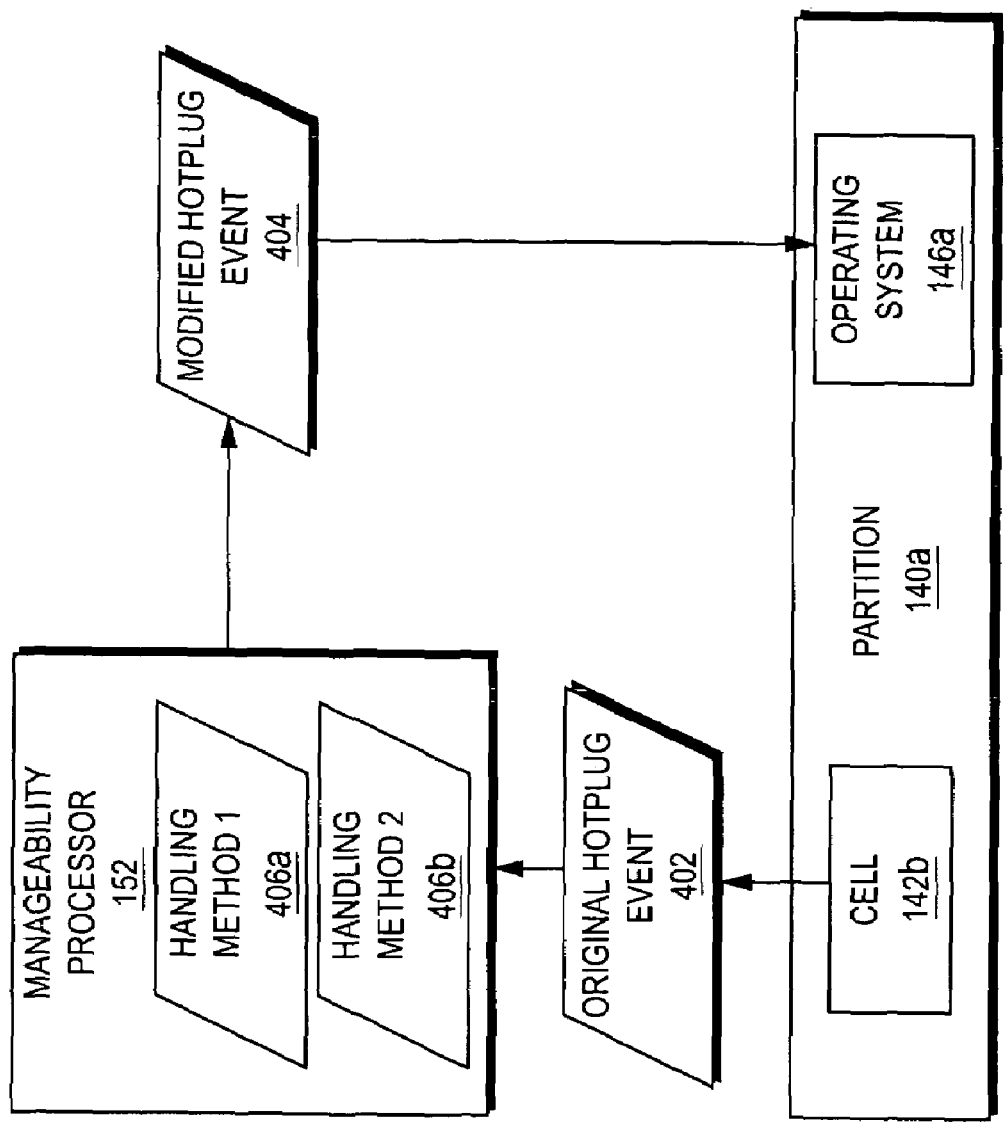
FIG. 4 is a data flow diagram illustrating operations performed by the computer system of FIGS. 1A-1B when performing the method of FIG. 3 in one embodiment.

Examples of techniques will now be described for supporting hotplug in all cells of a partition regardless of the number of cells in the partition and regardless of whether the operating system executing in the partition is a multi-block operating system. Referring to FIG. 3, a flowchart is shown of a method 300 that is performed by the computer system 100 in one embodiment to handle hotplug events for any of the operating systems 146*a-b* executing in the computer system 100. The method 300 handles hotplug events in any cell regardless of whether the corresponding operating system supports multiple GPE blocks. Referring to FIG. 4, a dataflow diagram is shown illustrating the flow of data among relevant elements of the computer system 100 (FIGS. 1A-1B) during execution of the method 300 shown in FIG. 3.

The manageability processor 152 receives a hotplug event 402 from the hardware layer 102 of one of the cells 144*a-p*, such as cell 142*b* (step 302). The hotplug event 402 is destined for the operating system 146*a* in the same partition 140*a* as the cell 142*b* from which the hotplug event 402 originated. The manageability processor 152 identifies a hotplug handling method associated with the partition 140*a* (step 304). For example, in one embodiment, there are two hotplug handling methods 406*a-b*, one for multi-block partitions and one for single-block partitions. To identify the hotplug handling method, therefore, the manageability processor 152 may determine whether the partition 140a is operating in multi-block mode (step 306). The manageability processor 152 may then select the multi-block handling method 406a if the partition 140a is operating in multi-block mode (step 308) and select the single-block handling method 406b otherwise (step 310).

The manageability processor 152 handles the hotplug event 402 using the hotplug handling method identified in step 304 (step 312). As will be described in more detail below, this may involve transmitting a modified version 404 of the hotplug event 402 to the operating system 146a executing in the partition 140a in accordance with the hotplug handling method (step 314).

Examples of techniques will now be described for implementing the different hotplug handling methods described above with respect to FIGS. 3-4. Recall that, for purposes of example, operating system 146a is a single-block operating system and operating system 146b is a multi-block operating system. As a result, although each of the cells 144a-h in partition 140a has a GPE block, the operating system 146a can only access GPE events generated by at most two of the cells 144a-h (because a GPE block may be sub-divided into two sub-blocks). To address this problem and enable the operating system 146a to access GPE events generated by all of the cells 144a-h, in one embodiment the operating system 146a is given exposure to GPE events in the root cell 142a of the partition 140a and the manageability processor 152 forwards (remaps) GPE events generated in any of the cells 144a-h to the root cell 142a. In this way the operating system 146a is given access to GPE events generated by all cells 144a-h even if the operating system 146a can only directly access GPE events in the root cell 142a.

Such forwarding of GPE events to the root cell of single-block partitions is an example of a first "hotplug handling method" as that term is used herein. For example, in the method 300 of FIG. 3, if the manageability processor 152 determines that the partition in which a hotplug event was generated is a single-block partition, the manageability processor 152 may forward the hotplug event to the root cell of the partition. If the manageability processor 152 determines that the partition is a multi-block partition, the manageability processor 152 may allow the hotplug event to be processed normally. This is an example of a second hotplug handling method.

The techniques described above with respect to FIGS. 3 and 4 require the manageability processor 152 to know whether a partition is operating in single-block or multi-block mode. This may require, for example, the manageability processor 152 to know which operating system is executing in the partition. In practice it may be difficult or inefficient to provide the manageability processor 152 with this knowledge. In another embodiment, therefore, the computer system 100 is provided with the ability to handle hotplug events in all cells of all partitions, regardless of the number of cells in a partition and regardless of whether multi-block operating systems are executing in the partitions.

In general, in this embodiment, whenever a cell generates a hotplug event, the manageability processor 152 replicates the event and forwards it (or a modified version of it) to the root cell of the cell partition. In other words, two different hotplug events are fired using two different methods. The manageability processor 152, therefore, does not need to know which method is appropriate for use with the executing operating system. Instead, the computer system 100 is pre-configured (based on the firmware tables and methods passed to the operating system by the system firmware 132) to expose the operating system only to the hotplug event that is transmitted to it using the appropriate method.

Examples of ways to implement this technique will now be described in more detail. Assume for purposes of example that each of the GPE blocks 144a-p is capable of representing 256 values, numbered from 0-255. In one embodiment, the "original" hotplug events that are generated by a cell use event numbers in the range 0-63. Note that such hotplug events need not use all event numbers in this range. When a hotplug event is forwarded to the root cell of a partition, the "forwarded" event is remapped to an event number in the range 64-255. As a result, both an original and a forwarded hotplug event can be generated without having overlapping event numbers. Note that the particular range (0-255) and breakdown of values (0-63 and 64-255) are provided herein merely as examples and do not constitute limitations of the present invention.

In this embodiment, a single-block operating system is only exposed to hotplug events in the range 64-255 in the root cell of the operating system's partition, while a multi-block operating system is only exposed to hotplug events in the range 0-63 in each of the cells in the operating system's partition. As a result, although two hotplug events are fired whenever the user initiates a hotplug operation, the corresponding operating system will only be exposed to a single hotplug event, regardless of whether the operating system is a single-block or multi-block operating system.

More specifically, if an original hotplug event in the range 0-63 is generated in a cell of a partition with a single-block operating system, that event will be forwarded to the root cell of the partition as an event in the range 64-255. The operating system will only see the forwarded event, because events in the range 0-63 have been masked from the operating system. Similarly, if an original hotplug event in the range 0-63 is generated in a cell of a partition with a multi-block operating system, that event will be forwarded to the root cell of the partition as an event in the range 64-255. The operating system will only see the original event, because events in the range 64-255 have been masked from the operating system.

To initialize this scheme, each operating system is informed of a range of valid event numbers at bootup. Returning to FIG. 2, if the operating system in the current partition supports multiple GPE blocks, then the system firmware 132 exposes to the operating system: (1) hotplug events in a first range (e.g., 0-63); and (2) methods for handling only those events (step 208). If the operating system in the current partition supports only a single GPE block, then the system firmware 132 exposes to the operating system: (1) hotplug events in a second range (e.g., 64-255); and (2) methods for handling only those events (step 212). The methods exposed in step 212 are aware of additional steps required in the single-block implementation, as will be described in more detail below with respect to FIG. 5. As is well-known to those having ordinary skill in the art, the system firmware 132 exposes GPE blocks using standard ACPI tables that are passed to the operating system during system startup.

The method 200 shown in FIG. 2 may be performed for each of the partitions 140a-b in the computer system 100b. Upon completion of the method 200 for all of the partitions 140a-b, the hotplug mode flags 148a-b contain appropriate values and the operating systems 146a-b have exposure to appropriate ranges of GPE events. In addition to only exposing appropriate events in steps 210 and 212, the system firmware 132 may perform additional steps to hide events from the operating systems 146a-b executing in the computer system 100. For example, the system firmware 132 may disable events that are out of range for an operating system, such as by setting the GPE enable/disable bit to "disable" for those events. In other words, in step 210 the system firmware 132 may disable GPE events in the second range (e.g., events 64-255), while in step 212 the system firmware 132 may disable GPE events in the first range (e.g., events 0-63).

Note that steps 210 and 212 need not be performed if the manageability processor 152 knows which operating system is executing in each partition, since in such a case it is possible for the manageability processor 152 to transmit only a single GPE event to each operating system (as described above in conjunction with FIGS. 3 and 4).

Figure 5:
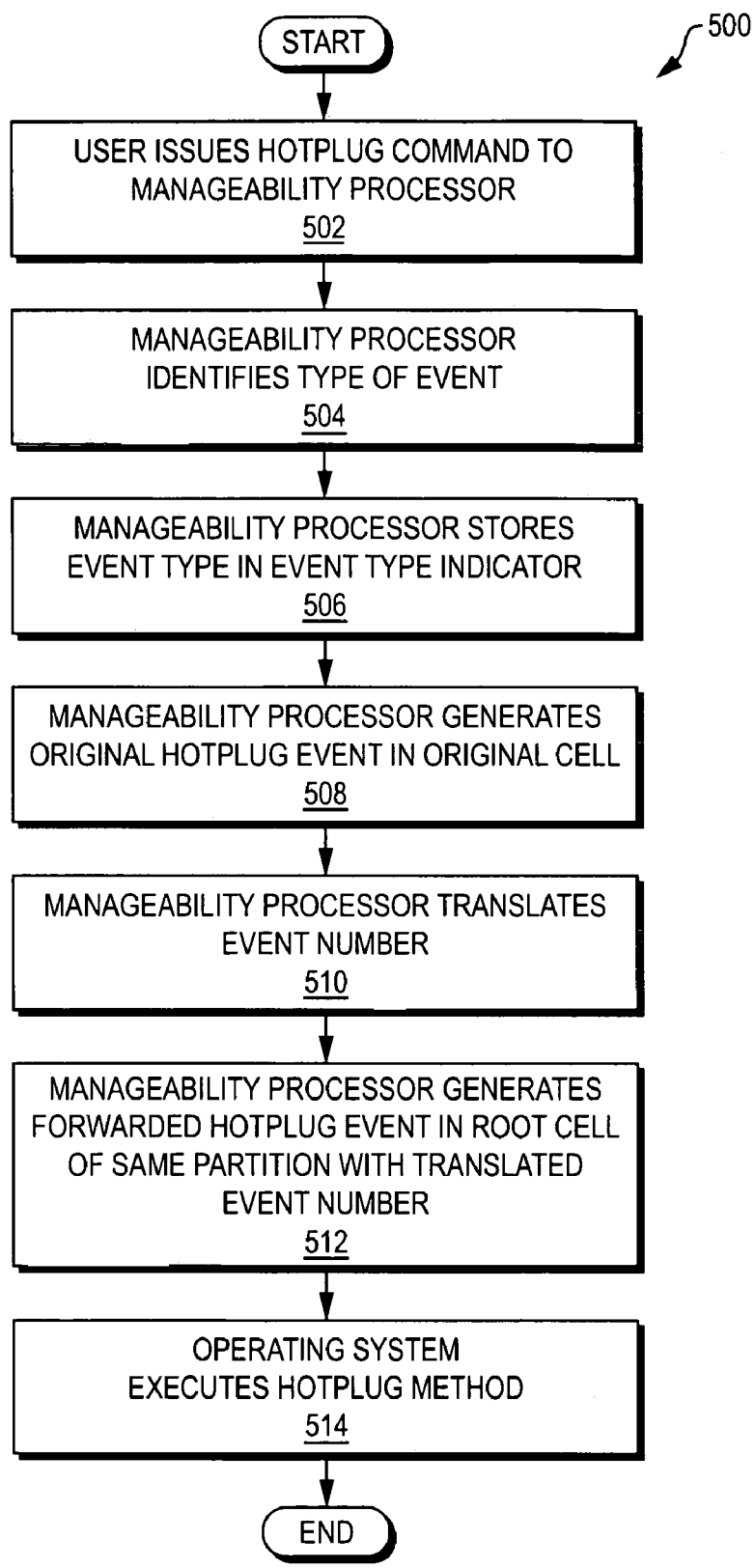
FIG. 5 is a flowchart of a method that is performed by the computer system of FIGS. 1A-1B in another embodiment to handle hotplug events for any of the operating systems executing in the computer system.
Figure 6:
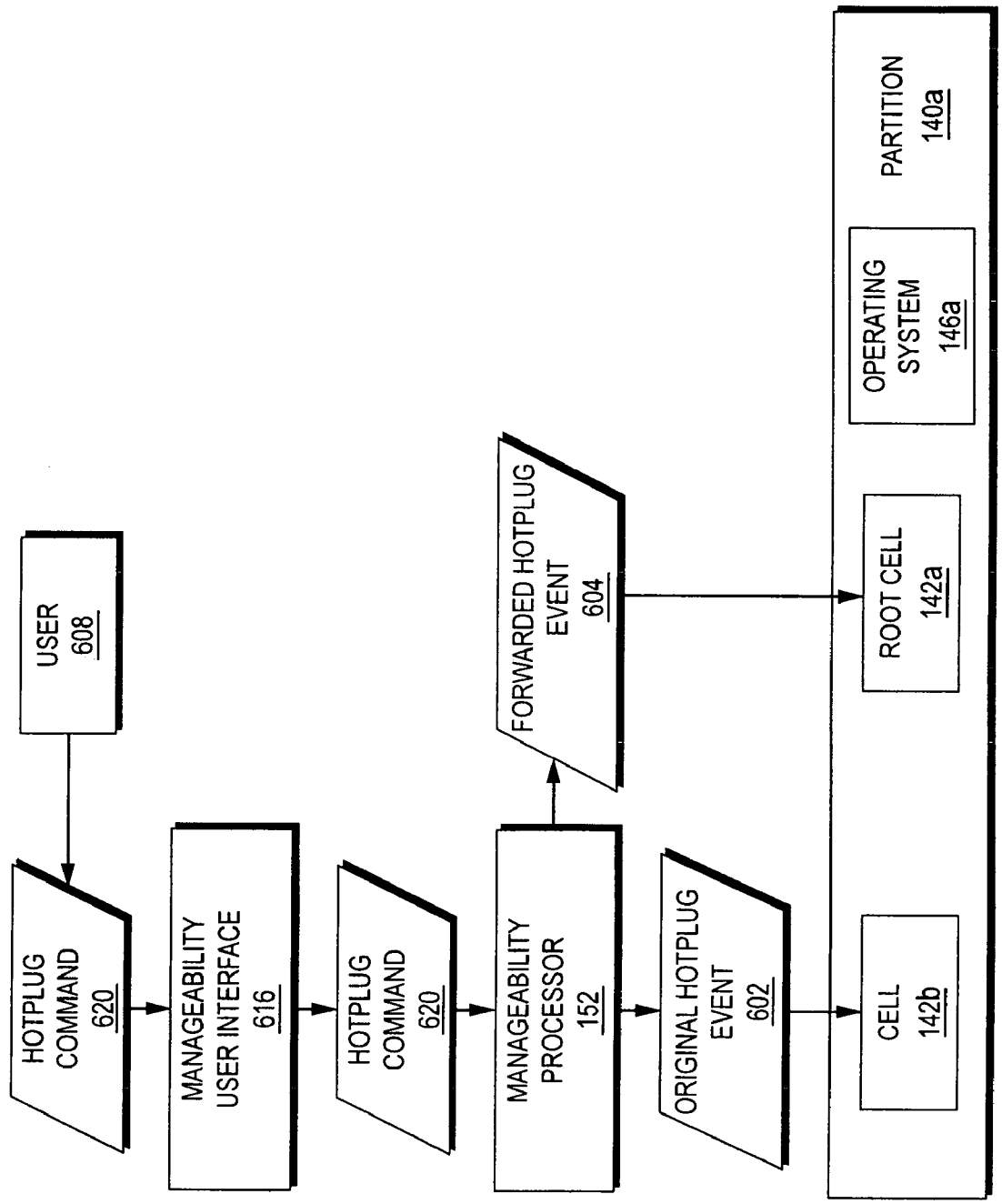
FIG. 6 is a data flow diagram illustrating operations performed by the computer system of FIGS. 1A-1B when performing the method of FIG. 5 in one embodiment.

Referring to FIG. 5, a flowchart is shown of a method 500 that is performed by the computer system 100 in one embodiment to handle hotplug events for any of the operating systems 146a-b executing in the computer system 100. The method 500 handles hotplug events in any cell regardless of whether the corresponding operating system supports multiple GPE blocks, and does not require the manageability processor 152 to know which operating system is executing in any partition. Referring to FIG. 6, a dataflow diagram is shown illustrating the flow of data among relevant elements of the computer system 100 (FIGS. 1A-1B) during execution of the method 500 shown in FIG. 5.

Upon powering up the computer system 100, the manageability processor 152 may present the user 608 with a manageability user interface (UI) 616. In general, the user 608 may provide commands 620 to the manageability processor 152 through the manageability UI 616, in response to which the manageability processor 152 may execute the commands 620. Examples of embodiments of the manageability UI 616 are described in more detail in the above-referenced patent application entitled, "Event Generation for Device Hotplug."

If the user 608 desires to add a device to or remove a device from the computer system 100, the user 608 may provide an appropriate command 620, referred to herein as a "hotplug command," to the manageability interface 616 (FIG. 5, step 502). The management processor 152 identifies the type of the hotplug event specified by the hotplug command 620 (step 504). Examples of hotplug event types include add, remove, and replace. The manageability processor 152 stores the event type in an event type indicator in the corresponding partition (step 506). The computer system 100 may, for example, include an auxiliary register in each cell or each partition. Each of the hotplug event type indicators 150a-b may be represented as a bit in the auxiliary register.

Use of the event type indicators 150a-b allows a larger number of hotplug events to be recognized. For example, if a hotplug event range of 0-255 were used to represent both add and remove events, then at most 128 slots could be supported because of the need to have two events (add and remove) per slot. If instead the auxiliary register is used to specify whether an event is an add or remove event, then each event in the range 0-255 may be used for both add and remove events for a single device slot.

The manageability processor 152 generates an original hotplug event 602 is generated in the cell containing the device slot specified by the user 608 in the hotplug command 620, such as cell 142b in partition 140a (step 508). Examples of techniques for generating a hotplug event are described in the above-referenced patent application entitled, "Event Generation for Device Hotplug." Note that a hotplug event may be generated in response to user input other than input provided through the manageability UI 616. For example, a hotplug event may be triggered when the user 608 presses a physical doorbell or other switch in the computer system 100.

Recall that the operating system 146a executing in the partition 140a supports only a single GPE block (i.e., the GPE block 144a in the root cell). Assume that the original hotplug event has event number 9 in the GPE block 144b of cell 142b. This GPE event will not, however, be seen by the operating system 146a because that GPE block, which is in a non-root cell, was not exposed at bootup to the operating system 146a, which is operating in single-block mode. Furthermore, even if the GPE event, having event number 9, had fired in the root cell, only GPE events in the range 64-255 were exposed to the operating system 146a during bootup (see FIG. 2), and the event would therefore not be seen by the operating system 146a. Techniques for exposing this event to the operating system 146a using alternate means will be described below.

The manageability processor 152 translates the event number of the original hotplug event 602 to a new event number for use in a forwarded hotplug event 604 (step 510). The purpose of this translation is to map event numbers used by multi-block operating systems to event numbers that do not overlap with those used by multi-block operating systems. If, for example, as described above, multi-block operating systems use the event number range 0-63, the translation step 308 may translate event numbers from the range 0-63 to the range 64-255. Note that some of the event numbers in range 0-63 may be unused or not used for hotplug events. For example, in one embodiment, there are 16 cells, each with 12 slots having 12 corresponding events, for a total of 192 events.

One example of a technique for translating the event number of the original hotplug event 602 to the event number of the forwarded hotplug event 604 is as follows. Let CELL_NUMBER be the number of the cell in which the original hotplug event occurred, and let SLOT_IN_CELL be the slot (e.g., PCI slot) at which the original hotplug event occurred. Assume for purposes of example that each cell has 12 slots, and that the range of 192 GPE event numbers is divided into two sets of 96 event numbers, corresponding to the two halves of the associated GPE block.

Let GPE_SET_NUMBER indicate whether an event number is in the first or second set of 96 events. Let GPE_NUMBER_IN_SET indicate the number of the event within its set. For example, GPE_SET_NUMBER=0 and GPE_NUMBER_IN_SET=34 refers to event number 34 in the first set of 96 events. Similarly, GPE_SET_NUMBER=1 and GPE_NUMBER_IN_SET=56 refers to event number 56 in the second set of 96 events. Values of GPE_NUMBER_IN_SET and GPE_SET_NUMBER may be derived from CELL_NUMBER and SLOT_IN_CELL using Equation 1 and Equation 2:

GPE_NUMBER_IN_SET=((CELL_NUMBER*12)+ SLOT_IN_CELL) % 96     Equation 1

GPE_SET_NUMBER=FLOOR(((CELL_NUMBER*12)+SLOT_IN_CELL)/96)     Equation 2

The event number of the forwarded event may then be generated using Equation 3:

FORWARDED_EVENT_NUMBER=64+GPE_SET_NUMBER*96+GPE_NUMBER_IN_SET     Equation 3

The manageability processor 152 then triggers the forwarded hotplug event 604 in the root cell 142a of the same partition as the original hotplug event 602, but with the translated event number (step 512). This effectively forwards the original event 602 from the original cell 142b to the root cell 142a of the same partition 140a.

Although two hotplug events have now been generated within the partition 140a, the operating system 146a executing within the partition 140a will only receive a single one of these events 602 and 604. Recall that the operating system 146a is a single-block operating system in the present embodiment. As described above, the operating system 146a is only exposed to events in the range 64-192 as a result of step 212 in FIG. 2. The operating system 146a, therefore, does not see the original event 602 because its event number is in the range 0-63. Furthermore, as described above, the original event 602 may be disabled by the system firmware 132. When the event number of the original event 602, however, is translated to the range 64-192 and forwarded as the forwarded event 604 to the root cell 142a, the operating system 146a sees the forwarded event 604.

Now consider an alternative example in which a hotplug event is generated in one of the cells 142i-p in partition 140b. Recall that the operating system 146b executing in the partition 140b supports GPE blocks in all of the cells 142i-p.

Now assume that a user triggers an original GPE event in cell 142k, such as by pressing a doorbell for the device installed in slot 12 (not shown) in cell 142k. Assume for purposes of example that this original GPE event is signaled in the GPE block 144k of cell 142k and has event number 12. This original GPE event will be seen by the operating system 146b because GPE events numbered 0-63 were exposed to the operating system 146b during bootup (see FIG. 2).

When the event number of the original event, however, is translated to the range 64-192 and forwarded to the root cell 142i, the operating system 146b does not see the forwarded event because its event number is outside of the exposed range 0-63. Furthermore, as described above, the forwarded event may be disabled by the system firmware 132.

Returning to FIG. 5, the operating system 146a handles the event that it sees using the corresponding firmware method (step 514). Techniques for associating hotplug events with corresponding firmware methods, and for executing such methods, are well-known to those having ordinary skill in the art. When the method is executed in single-block mode, the system firmware 132 reads the auxiliary register to identify the event type (e.g., add or delete) and performs the method appropriately.

The firmware event handling methods that are exposed to the operating system 146a may be programmed with the ability to determine whether the partition of the hotplug events 602 and 604 is operating in single-block mode. If the partition is operating in single-block mode, then the event handling method identifies the cell and slot number of the original hotplug event 602. To do this, the method decodes the event number of the forwarded hotplug event 604. Assume again, for example, that the range of 192 hotplug events (numbered 64-255) is subdivided into two groups of 96 events each. In such a case, the mapping described above may be reversed as shown in Error! Reference source not found. Equation 4 and Equation 5:

$$CELL\_NUMBER = FLOOR((FORWARDED\_EVENT\_NUMBER - 64)/12) \quad \text{Equation 4}$$

$$SLOT\_IN\_CELL = (FORWARDED\_EVENT\_NUMBER - 64) \% 12 \quad \text{Equation 5}$$

One the values of CELL_NUMBER and SLOT_IN_CELL have been identified, the event handling method may handle the hotplug event using conventional techniques.

Among the advantages of the invention are one or more of the following. In general, techniques disclosed herein enable a single computer system to support device hotplug in all cells of all partitions in a multi-partition computer system, regardless of the number of cells in each partition and regardless of whether any particular operating system in the computer system supports multiple GPE blocks. The computer system may include a plurality of operating systems, some of which support ACPI version 1.0b or lower (and therefore do not support multiple GPE blocks) and some of which support ACPI version 2.0 or higher (and therefore do support multiple GPE blocks). As a result, the computer system may include both kinds of operating systems without sacrificing the ability to provide full support for device hotplug in all cells of the computer system.

The techniques disclosed herein eliminate the need to use different hardware or firmware for each operating system to support hotplug for those operating systems. Instead, a single set of hardware/firmware in the manageability processor 152 may support hotplugging on multiple operating systems even when those operating systems handle hotplug in a variety of ways. Furthermore, the same techniques may be applied to forwarding not only hotplug events but any kind of event.

Furthermore, the techniques disclosed herein may be implemented in a computer system without modifying the operating system of the computer system. Rather, it is only necessary that some component or components of the computer system (such as the manageability processor 152) be modified to implement the techniques disclosed herein. By eliminating the need to modify operating systems, the techniques disclosed herein therefore enable computer systems to be equipped with enhanced hotplugging capabilities at lower cost than would be possible if it were necessary to modify one or more operating systems executing on the computer systems.

Furthermore, the techniques disclosed herein simplify the implementation of hotplug events in partitionable computer systems. In such a system, the hardware may be logically subdivided into multiple partitions, each of which may include multiple cells, each of which may include multiple chasses, each of which may include multiple I/O slots. Centralizing the handling of hotplug events in the manageability processor 152 allows the system to avoid the need to perform complicated routing of hotplug events within such a computer system.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Although certain functions are described herein as being performed by the manageability processor 152, this is not required. Rather, such functions may be performed by other components, whether in hardware, software, firmware, or any combination thereof.

The term "hotplug" is used generically herein to refer to the act of adding, removing, or replacing a device in a computer system while the computer system is running. Various terms may be used herein to refer to installing a device in a computer system, and should all be considered to have the same meaning herein: "add," "install," "insert," and "activate." Similarly, various terms are used herein to refer to uninstalling a device from a computer system, and should all be considered to have the same meaning herein: "remove," "de-install," "uninstall," and "deactivate."

Although certain examples herein may refer to PCI buses and devices connected to such buses, this is merely an example. The techniques disclosed herein may be used in conjunction with any kind of bus and device. Similarly, although certain examples herein refer to particular operating systems (such as the Microsoft Windows family of operating systems), these are merely examples. The techniques disclosed herein may be used in conjunction with any kind of operating system.

Although certain embodiments described above use a "root" cell, embodiments of the present invention are not limited to those involving the use of a root cell. Rather, the techniques disclosed herein may be used to handle hotplug events using different methods in a single complex even when no cells are designated as a "root" cell. Furthermore, the techniques disclosed herein may be used to forward (remap) hotplug events to cells that contain the necessary ACPI resources, even if such cells are not designated as "root" cells.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A computer-implemented method for use in a computer system, the method comprising:
    (A) receiving an indication of a first hotplug event destined for a first operating system executing in the computer system;
    (B) identifying, among a plurality of hotplug handling methods, a first hotplug handling method associated with the first operating system; and
    (C) handling the first hotplug event using the first hotplug handling method, comprising:
        (C)(1) modifying the first hotplug event to produce a modified hotplug event; and
        (C)(2) transmitting the modified hotplug event to the first operating system using the first hotplug handling method.

2. The method of claim 1, wherein (B) comprises:
    (B)(1) determining whether the first operating system supports a first version of Advanced Configuration and Power Interface (ACPI) having a first version number of at least 2.0;
    (B)(2) if it is determined that the first operating system supports the first version of ACPI, identifying a hotplug handling method associated with the first version of ACPI;
    (B)(3) otherwise, identifying a hotplug handling method associated with a second version of ACPI having a version number lower than 2.0.

3. The method of claim 1, wherein (B) comprises:
    (B)(1) identifying a type and version of the first operating system; and
    (B)(2) identifying a hotplug handling method associated with the type and version of the first operating system.

4. The method of claim 1, wherein (B) comprises identifying a General Purpose Event (GPE) block in which to generate the first hotplug event, and wherein (C) comprises generating the first hotplug event in the identified GPE block.

5. The method of claim 1, further comprising:
    (D) receiving an indication of a second hotplug event destined for a second operating system, differing from the first operating system, executing in the computer system;
    (E) identifying, among the plurality of hotplug handling methods, a second hotplug handling method, differing from the first hotplug handling method, associated with the second operating system; and
    (F) handling the second hotplug event using the second hotplug handling method.

6. The method of claim 1, wherein
(C)(1) comprises:
modifying an event number of the first hotplug event to produce the modified hotplug event.

7. The method of claim 1, wherein (A) and (B) are performed by a manageability processor in the computer system.

8. A computer system comprising:
an operating system;
a manageability processor comprising:
    a manageability user interface to receive an indication of a hotplug event destined for the operating system; and identification means for identifying, among a plurality of hotplug handling methods, a hotplug handling method associated with the operating system;

wherein the operating system comprises means for handling the hotplug event using the hotplug handling method, the means for handling comprising:

means for modifying the hotplug event to produce a modified hotplug event; and means for transmitting the modified hotplug event to the operating system using the hotplug handling method.

9. The computer system of claim 8, wherein the identification means comprises:

means for determining whether the operating system supports a first version of Advanced Configuration and Power Interface (ACPI) having a first version number of at least 2.0;

means for identifying a hotplug handling method associated with the first version of ACPI if it is determined that the operating system supports the first version of ACPI; and means for identifying a hotplug handling method associated with a second version of ACPI having a version number lower than 2.0 otherwise.

10. The computer system of claim 8, wherein the identification means comprises:

means for identifying a type and version of the operating system; and means for identifying a hotplug handling method associated with the type and version of the operating system.

11. A computer-implemented method for use in a computer system, the method comprising:

(A) receiving an indication of an original hotplug event for an operating system executing in the computer system;

(B) translating an original event number of the original hotplug event into a forwarded event number in a forwarded hotplug event;

(C) transmitting both the original hotplug event and the forwarded hotplug event to the operating system; and (D) at the operating system, receiving only one of the original hotplug event and the forwarded hotplug event.

12. The method of claim 11, further comprising:

(E) prior to (A), exposing to the operating system a first range of event numbers, the first range being a subset of a second range of event numbers;

wherein the original event number is not in the first range of event numbers;

wherein the forwarded event number is in the first range of event numbers; and wherein (D) comprises receiving at the operating system only the forwarded event and not the original event.

13. The method of claim 11, further comprising:

(E) prior to (A), exposing to the operating system a first range of event numbers, the first range being a subset of a second range of event numbers;

wherein the original event number is in the first range of event numbers;

wherein the forwarded event number is not in the first range of event numbers; and wherein (D) comprises receiving at the operating system only the original event and not the forwarded event.

14. The method of claim 11, wherein (A), (B), and (C) are performed by a manageability processor in the computer system.

15. The method of claim 11, wherein (C) comprises:

(C)(1) generating the original hotplug event in a first General Purpose Event (GPE) block of the computer system; and (C)(2) generating the forwarded hotplug event in a second GPE block of the computer system.

16. The method of claim 15, wherein the first and second GPE blocks are different blocks in the computer system.

17. The method of claim 15, wherein the first and second GPE blocks are the same block in the computer system.

18. An computer system comprising:

an operating system:

a manageability processor comprising:

a manageability user interface to receive an indication of an original hotplug event for the operating system;

translation means for translating an original event number of the original hotplug event into a forwarded event number in a forwarded hotplug event;

transmission means for transmitting both the original hotplug event and the forwarded hotplug event to the operating system; and wherein the operating system comprises means for receiving only one of the original hotplug event and the forwarded hotplug event.

19. The computer system of claim 18, further comprising:

system firmware comprising exposure means for exposing to the operating system a first range of event numbers, the first range being a subset of a second range of event numbers;

wherein the original event number is not in the first range of event numbers;

wherein the forwarded event number is in the first range of event numbers; and wherein the means for receiving comprises means for receiving at the operating system only the forwarded event and not the original event.

20. The computer system of claim 18, further comprising:

system firmware comprising exposure means for exposing to the operating system a first range of event numbers, the first range being a subset of a second range of event numbers;

wherein the original event number is in the first range of event numbers;

wherein the forwarded event number is not in the first range of event numbers; and wherein the means for receiving comprises receiving at the operating system only the original event and not the forwarded event.

* * * * *